(12) United States Patent
Doyle

(10) Patent No.: US 7,209,553 B2
(45) Date of Patent: Apr. 24, 2007

(54) CUTOVER METHOD AND DEVICE FOR TELEPHONE LINES

(75) Inventor: William Doyle, Southport, CT (US)

(73) Assignee: Dexter Systems, Inc., Southport, CT (US)

(*) Notice: Subject to any disclaimer, the term of this patent is extended or adjusted under 35 U.S.C. 154(b) by 662 days.

(21) Appl. No.: 10/688,775

(22) Filed: Oct. 17, 2003

(65) Prior Publication Data
US 2005/0084091 A1    Apr. 21, 2005

(51) Int. Cl.
H04M 7/00 (2006.01)
H04M 1/24 (2006.01)

(52) U.S. Cl. ............................ 379/221.02; 379/27.02

(58) Field of Classification Search .................... 379/9, 379/14, 15.01–15.03, 21, 26.01–27.04, 29.06, 379/207.02, 219, 220.01, 221.01, 221.02
See application file for complete search history.

(56) References Cited

U.S. PATENT DOCUMENTS

| | | | |
|---|---|---|---|
| 6,301,351 B1 * | 10/2001 | King | 379/221.01 |
| 6,661,888 B2 * | 12/2003 | Bell et al. | 379/221.13 |
| 6,983,037 B2 * | 1/2006 | Argo | 379/15.03 |
| 2003/0142811 A1 * | 7/2003 | Teixeira | 379/327 |

* cited by examiner

Primary Examiner—Benny Quoc Tieu
(74) Attorney, Agent, or Firm—Martin Novack

(57) ABSTRACT

A method for implementing a cutover of a subscriber telephone line from a telephone line of a first exchange to a telephone line of a second exchange, includes the following steps: providing a controllable switch that is operative, in response to a control signal, to couple the subscriber telephone line to either the telephone line of the first exchange or the telephone line of the second exchange; providing a controller, coupled with at least one of the telephone line of the first exchange and the telephone line of the second exchange, for producing the control signal, coupled to the switch, upon receiving a predetermined signal over said at least one of the telephone line of the first exchange and the telephone line of the second exchange; initially setting the switch to couple the subscriber telephone line to the telephone line of the first exchange; and sending the predetermined signal over at least one of the telephone line of the first exchange and the telephone line of the second exchange, whereby the controller, upon receipt of the predetermined signal, produces the control signal to cause the switch to couple the subscriber telephone line to the telephone line of the second exchange.

25 Claims, 4 Drawing Sheets

CUTOVER METHOD AND DEVICE FOR TELEPHONE LINES

FIELD OF THE INVENTION

This invention relates to telephone methods and systems and, more particularly, to a cutover method and device for telephone lines.

BACKGROUND OF THE INVENTION

Historically, the local phone system has been a monopoly with one phone company providing service to all subscribers within a certain geographic area. This particular phone company was responsible for making a large investment, building and maintaining an end-to-end network, and selling retail services on that network. The company owned all of the network elements: central office equipment and outside plant loops (wires). Since the network was a major investment and it didn't make economic sense to have two phone networks, the government allowed the one network (a natural monopoly), but subjected the phone company to regulation.

While operating as a monopoly, the phone company would sell 'phone service' to a subscriber and 'bundle' all of the network elements needed to provide the service. The subscriber's only option was to buy the service and accept the bundled network elements.

In an effort to foster competition in the local phone market and create benefits for consumers, the US Government passed the Telecommunications Act of 1996. This Act mandated that local monopoly phone companies make 'Unbundled Network Elements' (UNEs) available to competing phone companies. This provision gave competitive phone companies (Competitive Local Exchange Carriers, or CLECs) the right to lease equipment and local loops from the incumbent phone company (incumbent Local Exchange Carrier, or ILEC). As a result of the Act, a consumer could more easily subscribe to phone service offered by a competitive phone company (CLEC). The CLEC leases an unbundled loop from the ILEC, and uses that loop to deliver service to the consumer/subscriber. In this arrangement, a CLEC provides the central office equipment and the ILEC provides the loop.

Federal and state regulatory agencies created strict rules under which the incumbents had to deliver UNEs to the CLECs. For example, in the above scenario, when an existing subscriber wished to switch from the ILEC to the CLEC, and the subscriber was re-using the same loop, the transition (or cutover) had to be smooth and had to take less than one hour. If the subscriber was out of service for more than one hour, the ILEC could be fined.

Reference can be made to FIG. 1 to aid in understanding a type of procedure presently used. In the ILEC Central Office (CO), represented at 100, there is the ILEC switching equipment (switch), represented at 110, and an inside wire jumper 125 in a Main Distributing Frame (MDF), represented at 120. The MDF has two sides. One side contains the termination points of wires coming from the switch. The other side contains the termination points of the local loops that extend out to the subscribers. In FIG. 1, an exemplary local loop wire is shown at 161, and it is coupled to a subscriber (190) via crossbox 170 and telephone pole (180) wiring. The wire jumper (e.g. 125) connects these two termination points. Whereas the switch and outside local loop wire are considered permanent fixtures, the inside wire jumper is considered temporary because it lasts only as long as the subscriber is in service. The ILEC switch emits an analog signal (dial-tone) that travels from the switch port to the MDF, through the wire jumper to the other side of the MDF, and from the MDF out to the subscriber via the local loop wire.

A CLEC, the central office of which is represented at 150, may install some equipment in the ILEC's central office. This equipment extends the dial tone from the CLEC's switch (155), which is at a remote location. In a large central office, it is common to have equipment for many CLECs 'co-located' in the central office. An example is the CLEC cage, shown at 165, within the ILEC central office 100. Fiber optics cable 185 is shown as coupling the CLEC switch 155 in the ILEC central office 100. Theoretically, a subscriber can get their phone service from any one of those co-located CLECs. When a subscriber wants to change phone companies, the most likely scenario is to keep their existing local loop and connect to a co-located CLEC's equipment in the ILEC's central office. The process of changing from an ILEC to a CLEC, while minimizing the amount of out-of-service time, is called a Coordinated Conversion or Coordinated Cut. Other similar industry terms, used interchangeably, are: cutover, cut, and or hot-cut.

The cutover usually takes place in several steps. On Day 1 the ILEC takes the order from the CLEC. On Day 3, an ILEC technician runs a new wire jumper 128 from the CLEC cage to a point at the main distributing frame (MDF) but does not connect the wire to the subscriber. The technician also verifies that dial-tone is emitting from the CLEC equipment. On Day 5, at an appointed hour known as the Frame Due Time (FDT) an ILEC technician:

1) Disconnects the ILEC wire jumper from the local loop, thereby disconnecting the ILEC switching equipment and putting the subscriber out-of-service.
2) Connects the CLEC wire jumper (128) to the local loop, thereby connecting the subscriber to the CLEC switch and putting the subscriber back in service.

The first problem for the ILEC is that they need a technician to perform work on Day 3 and Day 5. Moreover, there is no flexibility in scheduling the FDT on Day 5, which is set by the CLEC and must be completed in a 1 hour window for 10 lines or less. (Somewhat more time is allotted for a cutover consisting of more than 10 lines.) When there are hundreds or thousands of orders per day the work force requirements are substantial, since ILEC technicians must be available at specified times in order to complete the cutovers in accordance with federal and state requirements.

The second problem for the ILEC is to verify that a dial-tone signal is emitting from the CLEC's switch, and that the correct telephone number is translated in the CLEC's switch. Although it is the CLEC's responsibility to program their switch to turn on the dial-tone, it is the ILEC's responsibility to verify the dial tone is present in the ILEC central office. The ILEC accomplishes this on Day 3 by having an ILEC technician test for dial-tone during the wiring process. If dial tone is present, the technician then performs an ANI test (Automated Number Identification) and verifies the correct phone number is emitting from the CLEC switch. If both tests pass, the CLEC translation process is correct. If either test fails, the ILEC technician must report the status back to an ILEC control center. The ILEC control center informs the CLEC of the bad test, the CLEC takes corrective action, and, some time later, the ILEC technician repeats the test. The test for dial tone is a manual process because on Day 3, the CLEC is not wired to any ILEC equipment.

It is among the objects of the present invention to provide solution to the above problems, and to improve the efficiency of telephone cutover procedures.

SUMMARY OF THE INVENTION

An embodiment of the invention is directed to a method for implementing a cutover of a subscriber telephone line from a telephone line of a first exchange to a telephone line of a second exchange, including the following steps: providing a controllable switch that is operative, in response to a control signal, to couple the subscriber telephone line to either the telephone line of the first exchange or the telephone line of the second exchange; providing a controller, coupled with at least one of the telephone line of the first exchange and the telephone line of the second exchange, for producing the control signal, coupled to the switch, upon receiving a predetermined signal over said at least one of the telephone line of the first exchange and the telephone line of the second exchange; initially setting the switch to couple the subscriber telephone line to the telephone line of the first exchange; and sending the predetermined signal over at least one of the telephone line of the first exchange and the telephone line of the second exchange, whereby the controller, upon receipt of the predetermined signal, produces the control signal to cause the switch to couple the subscriber telephone line to the telephone line of the second exchange.

In a preferred embodiment of the invention, the predetermined signal is a telephone call from a predetermined telephone number. In this embodiment, the step of providing a controller includes providing a controller which comprises a caller ID circuit and a processor that is responsive to predetermined telephone number recognition indications from the caller ID circuit for producing the control signal.

In another form of the invention there is disclosed a device for use in implementing temporary cutover of a subscriber telephone line from a telephone line of a first exchange to a telephone line of a second exchange, comprising: a controllable switch having a main leg coupleable to the subscriber telephone line, a first leg coupleable to the telephone line of the first exchange, and a second leg coupleable to the telephone line of the second exchange, and operative, in response to a control signal, to couple the subscriber telephone line to either the telephone line of the first exchange or the telephone line of the second exchange; and a controller for producing the control signal upon receipt, from a remote location, of a predetermined trigger signal. In a preferred embodiment of this form of the invention, the controller is coupled with at least one of the telephone line of the first exchange and the telephone line of the second exchange for producing the control signal, coupled to the switch, upon receiving a predetermined signal over the at least one of the telephone line of the first exchange and the telephone line of the second exchange. Also in this embodiment, the controller comprises a caller ID circuit and a processor that is responsive to predetermined telephone number recognition indications from the caller ID circuit for producing the control signal.

Further features and advantages of the invention will become more readily apparent from the following detailed description when taken in conjunction with the accompanying drawings.

DETAILED DESCRIPTION

Figure 1:
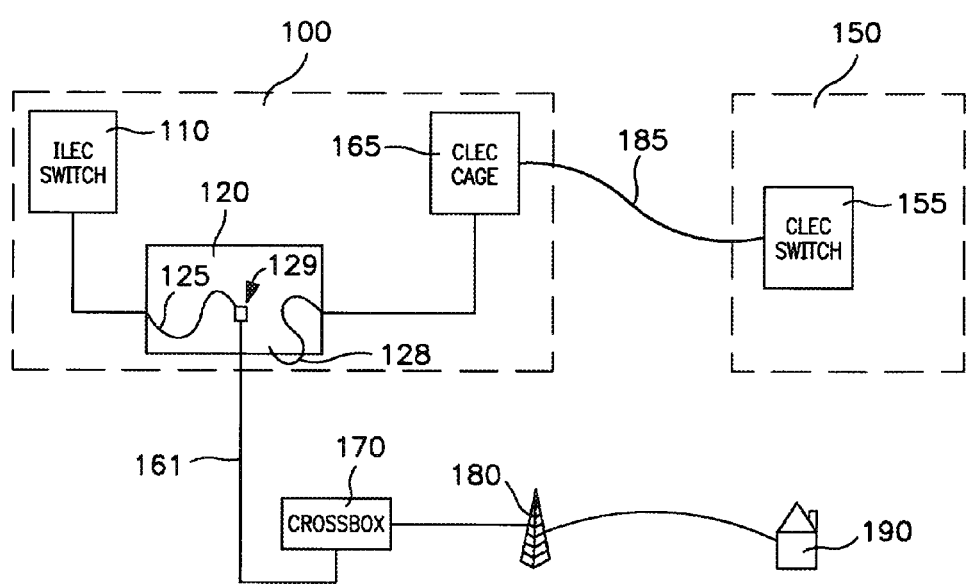
FIG. 1 is a diagram of a telephone system, illustrating the manner in which a cutover from ILEC to CLEC is typically implemented at present.
Figure 2:
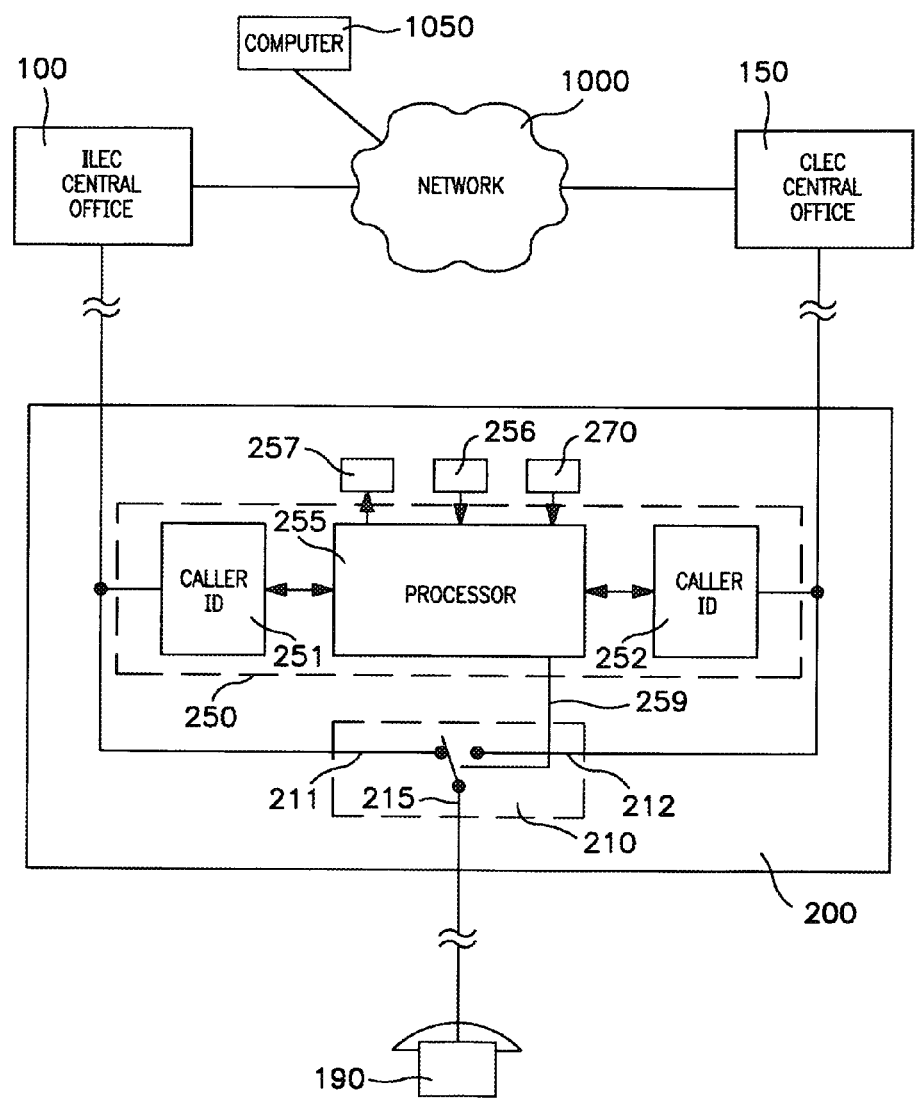
FIG. 2 is a diagram, partially in block form, of a device in accordance with an embodiment of the invention, and which can be used in practicing embodiments of the method of the invention.

FIG. 2 shows a device 200 in accordance with an embodiment of the invention, and which can be used in practicing embodiments of the method of the invention. In the present embodiment, the device 200 is wired into the telephone system at the location 129 in FIG. 1. The device 200 includes a latching relay switch 210 and a controller 250 (in dashed enclosure) which, in turn, includes a processor 255 and, coupled therewith, at least one caller ID module, 251, that comprises a caller ID chip and a modem. In the present embodiment, the controller 250 includes a second caller ID module, 252, which also comprises a caller ID chip and a modem. The processor 255 may be, for example, any suitable known microprocessor subsystem including associated memory and input/output functions (not separately shown). Coupled with the processor 255 are a keypad 256, for operator inputs, and a display 257. The device of this embodiment is powered by a battery, represented at 270.

The switch 210 has its main leg 215 coupled (meaning, where applicable, coupled ultimately) to the subscriber's telephone 190. The first leg 211 of the switch 210, and the caller ID module 251 are both coupled to the existing line from ILEC central office 100. The second leg 212 of the switch 210, and the caller ID module 252 are both coupled to the proposed new line originating from the CLEC switch 155 of the CLEC central office 150 (via CLEC cage 165 and fiber optics cable 185 in FIG. 1). A control signal form the processor 255, on line 259, determines the position of the switch 210. A public telephone network 1000 is shown as being coupled with the ILEC and CLEC central offices, and a computer 1050 can be utilized by a telephone company employee at a control center in implementing an embodiment of a method hereof.

Embodiments of the present invention make advantageous use of a feature known as caller ID that telephone companies started selling more than ten years ago to enable subscribers to identify who is calling prior to answering the phone. Typically, a device with a chip and a small display screen connects to the local loop and displays the name and phone number of the calling party. The telephone company sends the calling party information across the local loop between the first and second rings. The information is encoded using a well known analog modulation technique called Frequency Shift Keying (FSK). The primary conventional use of the caller ID feature is to display calling party information to subscribers, but it is used herein for another purpose.

One of the purposes of the device 200 is to eliminate the need to dispatch an ILEC technician to complete cutovers on Day 5, thus substantially reducing work force requirements. The proposed device uses the caller ID feature in producing a signal to mechanically switch a subscriber from the ILEC to the CLEC, rather than having an ILEC technician switch the wire jumpers. The device 200 can be wired in on Day 3, when the ILEC technician installs the wire jumper from the CLEC cage to the MDF. Alternatively, the device can be wired in sometime during periods of lower work load prior to Day 5. Another purpose of the device is to automate the dial tone test and ANI test normally performed on Day 3.

In operation, an embodiment hereof uses the caller ID signal to trigger the control signal that changes the state of the relay switch. When the switch position is changed, the subscriber is disconnected from the ILEC and connected to the CLEC. This will enable an ILEC clerk, working in a control center many miles away from the central office, to make the call to trigger the cutover from the ILEC to the CLEC. The controller is programmed to recognize a particular phone number and only activate the relay when that telephone number comes across the wire. (For example, if the number 212-555-1234 is programmed into the memory, only a call originating that number will activate the switch.) This stored phone number may, for example, be chosen to be that of a telephone in an ILEC control center, so that clerks working in the control center can activate the cutover.

In an embodiment hereof, the device 200 has an internal unique serial number that is 'burned in' to the device. One of the buttons of keypad 256 is a test button. When the technician pushes the test button (normally after the device is wired-in on Day 3) the device makes two outgoing calls: one via each of the two I/O phone lines. The calls will be carried by the respective ILEC and CLEC switches to a receiving computer. The receiving computer has caller ID detection capability. Upon connecting to the receiving computer, the device will transmit the unique serial number and a status message. The receiving computer will record serial number, status message, and the caller ID telephone number that is detected from the call. This information can be stored in a database on the receiving computer at the control center.

Under normal circumstances, the receiving computer will receive two calls with the same serial number. When the device makes a call from I/O module 251, it will travel through the ILEC switch and the receiving computer will detect (via caller ID) the telephone number that is programmed into the ILEC switch. When the device makes a call from I/O module 252, the call will travel through the CLEC switch, and the receiving computer will detect (via caller ID) the telephone number that is programmed into the CLEC switch.

The receiving computer can use the device serial number as the common element when matching up the two received calls. Under normal conditions the two calls should report the same telephone number. This means the CLEC switch is programmed with the same telephone number as that in the ILEC switch. If the telephone numbers are different, it indicates a wiring error or translation error. If only one call is received, it may also indicate a programming or wiring error. The receiving computer can then notify a technician of the discrepancy, and instruct the technician to investigate the problem. Several days after a successful cutover, the ILEC technician, at a convenient time, can hard-wire the CLEC jumper to the outside loop, and remove the device. The device can then be re-used on another cutover for another customer. A clerk in the control office may also connect to device, send a cut 'finished' status message, and this status will be displayed on the device's display. An ILEC technician can pick up the device, see the status on the display, and proceed to remove the device.

The predetermined trigger signal could also be a distinctive ringing signal which can be recognized by a circuit for detecting different rings. (A distinctive ringing signal is one that is different than the standard 25% duty cycle of 1 second ring, followed by a 3 second silence).

Although the illustrated device is shown as handling a single line, it will be evident that the device may handle multiple lines using the same principles.

Figure 3:
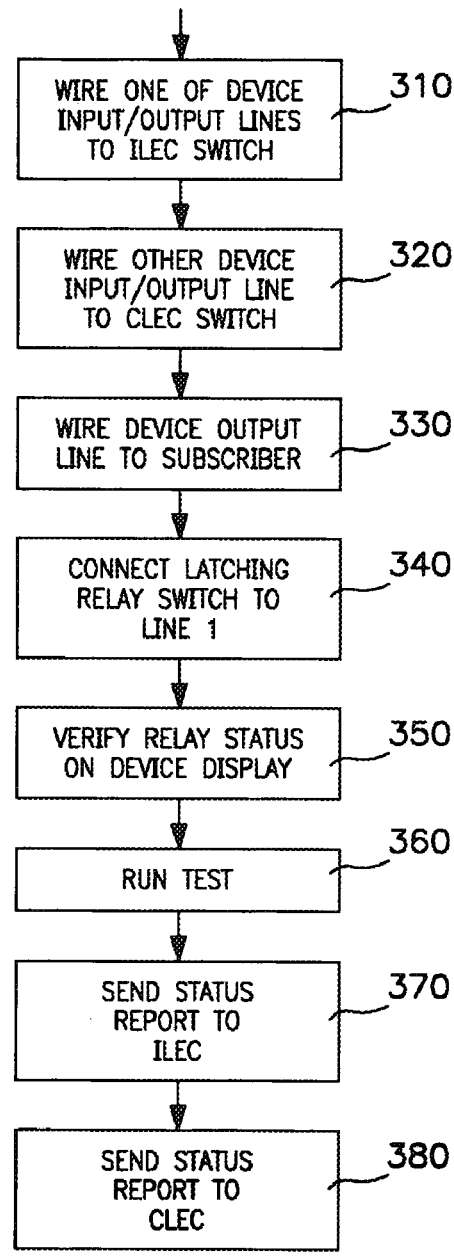
FIG. 3 is a flow diagram of steps of a procedure in accordance with an embodiment of the invention.

Referring to FIG. 3, there is shown a flow diagram of the steps for implementing a procedure in accordance with an embodiment of the invention. The block 310 represents wiring the leg 211 of the switch and the caller ID module 251 to the existing line of the ILEC switch. The block 320 represents wiring the leg 212 and the caller ID module 252 to the proposed line from the CLEC switch. The block 330 represents wiring the main leg 215 of the switch to the subscriber line. The block 340 represents the step of connecting the main leg 215 of the latching relay switch to the position of leg 211; that is, the position wherein the subscriber line will be coupled to the existing line of the ILEC switch. This can be done using one of the buttons on the keypad 256, which results in production of the desired control signal to the switch 210. The switch position can be indicated on the display 257, and the block 350 represents verification of the switch status by the technician. Any desired test can then be run (block 360), and a status report can be issued to the ILEC. If and when appropriate, a status report can also be sent to the CLEC, and represented by the block 370.

Figure 4:
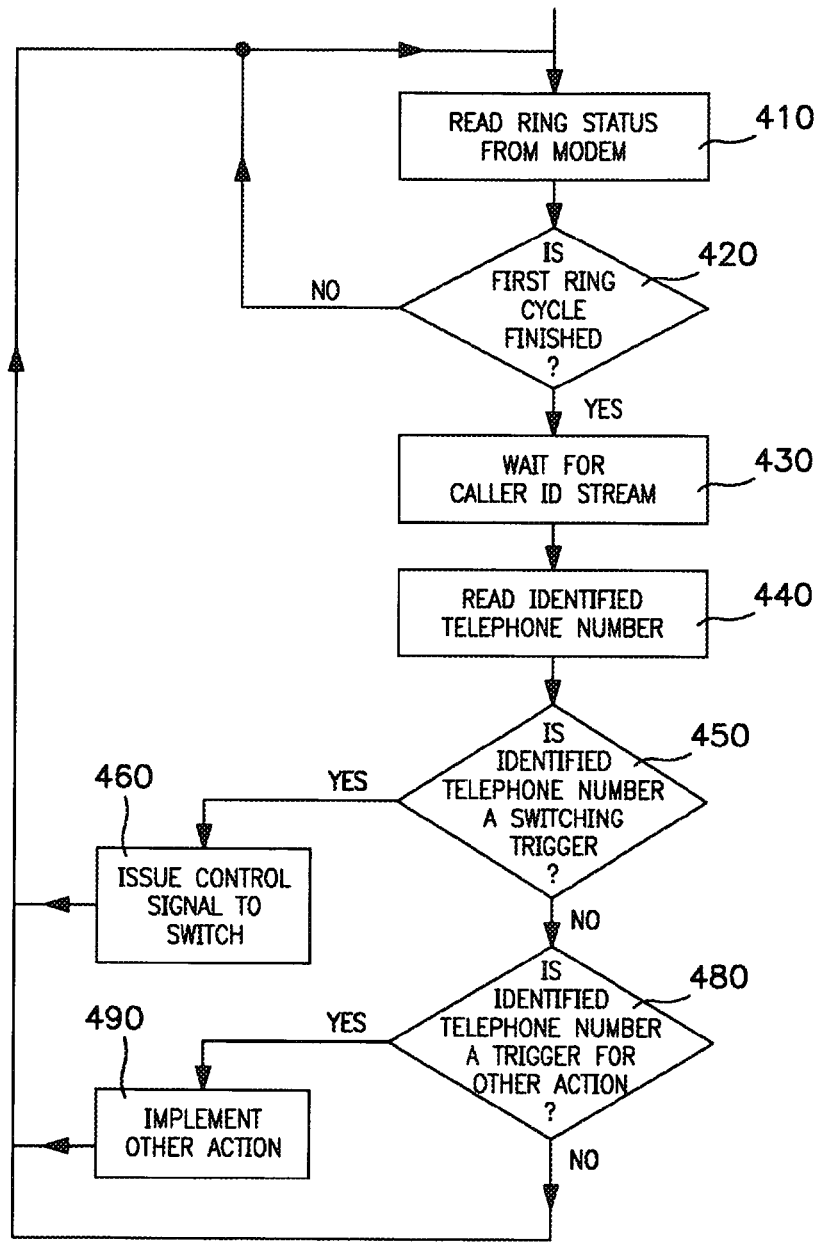
FIG. 4 is a flow diagram of a routine for programming the processor of a device in accordance with an embodiment of the invention.

FIG. 4 is a flow diagram of a routine for programming the processor 255 of device 200 in accordance with an embodiment of the invention. The block 410 represents reading of ring status from the modem of the module 251 and/or 252. (It is noted that a signaling telephone call to module 252 has the benefit of traveling over the proposed new line from the CLEC.) Determination is made (decision block 420) as to whether the first ring cycle is finished. If not, the block 410 is re-entered. If so, the block 430 is entered, and the caller ID stream is awaited. Then, as represented by the block 440, the identified source telephone number is read. Determination is then made (decision block 450) as to whether the identified telephone number is a predetermined switching control trigger If so, the block 460 is entered, and a control signal is issued on control line 259 to put the status of the switch in the position determined by the identified telephone number. If not, decision block 480 is entered, and determination is made as to whether the identified telephone number is a trigger for any other action. If so, the action is implemented (block 490), and the block is re-entered.

The invention has been described with reference to exemplary preferred embodiments, but variations within the spirit and scope of the invention will occur to those skilled in the art. As an example, it will be understood that a single module of caller ID circuit and modem could be used, or could be shared for two telephone lines. As further example, it will be understood that the processor functions could, if desired, be implemented, in whole or in part, with hardware instead of software. Finally, although it is less preferred, it will be understood that the trigger for the latching switch could be sent and received using other means, for example by cell phone.

The invention claimed is:

1. A method for implementing a cutover of a subscriber telephone line from a telephone line of a first exchange to a telephone line of a second exchange, comprising the steps of:
   providing a controllable switch that is operative, in response to a control signal, to couple the subscriber telephone line to either said telephone line of the first exchange or said telephone line of the second exchange;
   providing a controller, coupled with at least one of said telephone line of the first exchange and said telephone line of the second exchange for producing the control signal, coupled to said switch, upon receiving a predetermined signal over said at least one of said telephone line of the first exchange and said telephone line of the second exchange;
   initially setting said switch to couple the subscriber telephone line to said telephone line of the first exchange; and
   sending said predetermined signal over at least one of said telephone line of the first exchange and said telephone line of the second exchange, whereby said controller, upon receipt of said predetermined signal, produces said control signal to cause said switch to couple said subscriber telephone line to said telephone line of the second exchange.

2. The method as defined by claim 1, wherein said predetermined signal is a telephone call from a predetermined telephone number.

3. The method as defined by claim 1, wherein said step of providing a controller includes providing a controller which comprises a caller ID circuit and a processor that is responsive to predetermined telephone number recognition indications from said caller ID circuit for producing said control signal.

4. The method as defined by claim 2, wherein said step of providing a controller includes providing a controller which comprises a caller ID circuit and a processor that is responsive to predetermined telephone number recognition indications from said caller ID circuit for producing said control signal.

5. The method as defined by claim 3, wherein the first exchange is an ILEC, and the second exchange is a CLEC.

6. The method as defined by claim 4, wherein the first exchange is an ILEC, and the second exchange is a CLEC.

7. The method as described by claim 6, wherein said step of providing said controllable switch and said controller comprises providing said switch and controller at a central office of the ILEC.

8. The method as defined by claim 3, wherein said processor is operative, upon indication from said caller ID circuit of receipt of a telephone call from a first predetermined telephone number, to put said switch in a position connecting said subscriber telephone line to said telephone line of the first exchange, and is operative, upon indication from said caller ID circuit, of a telephone call from a second predetermined telephone number, to put said switch in a position connecting said subscriber telephone line to said telephone line of the second exchange.

9. The method as defined by claim 5, wherein said processor is operative, upon indication from said caller ID circuit of receipt of a telephone call from a first predetermined telephone number, to put said switch in a position connecting said subscriber telephone line to said telephone line of the first exchange, and is operative, upon indication from said caller ID circuit, of a telephone call from a second predetermined telephone number, to put said switch in a position connecting said subscriber telephone line to said telephone line of the second exchange.

10. The method as defined by claim 1, wherein said predetermined signal is a distinctive ring.

11. A method for implementing a cutover of a subscriber telephone line from a telephone line of a first exchange to a telephone line of a second exchange, comprising the steps of:
    temporarily connecting a circuit that includes a controllable switch and a controller to said subscriber telephone line, said telephone line of the first exchange and said telephone line of the second exchange, said controllable switch being operative, in response to a control signal, to couple said subscriber telephone line to either said telephone line of the first exchange or said telephone line of the second exchange, and said controller being operative to produce the control signal, upon receiving a predetermined signal over said at least one of said telephone line of the first exchange and said telephone line of the second exchange;
    initially setting said switch to couple the subscriber telephone line to said telephone line of the first exchange; and
    sending said predetermined signal over at least one of said telephone line of the first exchange and said telephone line of the second exchange, whereby said controller, upon receipt of said predetermined signal, produces said control signal to cause said switch to couple said subscriber telephone line to said telephone line of the second exchange; and
    wiring said subscriber telephone line to said telephone line to said telephone line of the second exchange, and disconnecting said circuit.

12. The method as defined by claim 11, wherein said predetermined signal is a telephone call from a predetermined telephone number.

13. The method as defined by claim 11, wherein said predetermined signal is a distinctive ring.

14. The method as defined by claim 11, wherein said step of temporarily connecting a circuit that includes a controllable switch and a controller includes providing a controller which comprises a caller ID circuit and a processor that is responsive to predetermined telephone number recognition indications from said caller ID circuit for producing said control signal.

15. The method as defined by claim 12, wherein said step of temporarily connecting a circuit that includes a controllable switch and a controller includes providing a controller which comprises a caller ID circuit and a processor that is responsive to predetermined telephone number recognition indications from said caller ID circuit for producing said control signal.

16. The method as defined by claim 14, wherein the first exchange is an ILEC, and the second exchange is a CLEC.

17. The method as defined by claim 15, wherein the first exchange is an ILEC, and the second exchange is a CLEC.

18. The method as defined by claim 14, wherein said processor is operative, upon indication from said caller ID circuit of receipt of a telephone call from a first predetermined telephone number, to put said switch in a position connecting said subscriber telephone line to said telephone line of the first exchange, and is operative, upon indication from said caller ID circuit, of a telephone call from a second predetermined telephone number, to put said switch in a position connecting said subscriber telephone line to said telephone line of the second exchange.

19. The method as defined by claim 15, wherein said processor is operative, upon indication from said caller ID circuit of receipt of a telephone call from a first predetermined telephone number, to put said switch in a position connecting said subscriber telephone line to said telephone line of the first exchange, and is operative, upon indication from said caller ID circuit, of a telephone call from a second predetermined telephone number, to put said switch in a position connecting said subscriber telephone line to said telephone line of the second exchange.

20. A cutover device for use in implementing temporary cutover of a subscriber telephone line from a telephone line of a first exchange to a telephone line of a second exchange, comprising:
   a controllable switch having a main leg coupleable to said subscriber telephone line, a first leg coupleable to said telephone line of the first exchange, and a second leg coupleable to said telephone line of the second exchange, and operative, in response to a control signal, to couple the subscriber telephone line to either the telephone line of the first exchange or the telephone line of the second exchange; and
   a controller for producing said control signal upon receipt, from a remote location, of a predetermined trigger signal.

21. The device as defined by claim 20, wherein said trigger signal is a telephone call from a predetermined telephone number.

22. The device as defined by claim 20, wherein said controller is coupled with at least one of said telephone line of the first exchange and said telephone line of the second exchange for producing the control signal, coupled to said switch, upon receiving a predetermined signal over said at least one of said telephone line of the first exchange and said telephone line of the second exchange.

23. The device as defined by claim 20, wherein said controller comprises a caller ID circuit and a processor that is responsive to predetermined telephone number recognition indications from said caller ID circuit for producing said control signal.

24. The device as defined by claim 21, wherein said controller comprises a caller ID circuit and a processor that is responsive to predetermined telephone number recognition indications from said caller ID circuit for producing said control signal.

25. The device as defined by claim 22, wherein said controller comprises a caller ID circuit and a processor that is responsive to predetermined telephone number recognition indications from said caller ID circuit for producing said control signal.

* * * * *